United States Patent [19]

Mydynski et al.

[11] Patent Number: 4,718,777
[45] Date of Patent: Jan. 12, 1988

[54] ISOTHERMAL BLOCK FOR TEMPERATURE MEASUREMENT SYSTEM USING A THERMOCOUPLE

[75] Inventors: Steven T. Mydynski, Bothell; John M. Redfield, Jr., Seattle; Bryan L. Sparrowhawk, Everett; Alfred T. Volberding, Bellevue, all of Wash.

[73] Assignee: John Fluke Mfg. Co., Inc., Everett, Wash.

[21] Appl. No.: 834,778

[22] Filed: Feb. 28, 1986

[51] Int. Cl.$^4$ .......................... G01K 7/00; G01K 7/12
[52] U.S. Cl. .................................. 374/181; 374/182; 439/629
[58] Field of Search ............... 374/179, 181, 182, 178; 339/176 M, 176 MP

[56] References Cited

U.S. PATENT DOCUMENTS

| | | | |
|---|---|---|---|
| 2,475,238 | 7/1949 | Hall et al. ........................... | 374/179 |
| 3,069,909 | 12/1962 | Hines ................................. | 374/182 |
| 3,289,148 | 11/1966 | Antes .......................... | 339/176 MP |
| 3,648,523 | 3/1972 | Kemper et al. .................... | 374/182 |
| 3,993,381 | 11/1976 | Horbach ..................... | 339/176 MP |
| 4,334,727 | 6/1982 | Scheingold et al. .......... | 339/176 M |
| 4,483,632 | 11/1984 | Dewey et al. ...................... | 374/182 |
| 4,575,175 | 3/1986 | Wilson ......................... | 339/176 MP |

FOREIGN PATENT DOCUMENTS

| | | | |
|---|---|---|---|
| 1085366 | 2/1955 | France ................................. | 374/181 |
| 41570 | 3/1977 | Japan .................................. | 374/181 |
| 876556 | 9/1961 | United Kingdom ................. | 374/178 |

Primary Examiner—Charles Frankfort
Assistant Examiner—W. Morris Worth
Attorney, Agent, or Firm—Stephen A. Becker

[57] ABSTRACT

In a temperature measurement system using a thermocouple connected to a pair of circuit wires coupled to a voltmeter for providing an output reading, an isothermal block (48) formed of alumina ceramic contains a series of openings (58-66) in linear juxtaposition. Metal connectors (68) located in two of the openings to interconnect the thermocouple and printed circuit wires of a circuit board (52) establish a reference junction. A temperature sensor (50), preferably a transistor, in a third opening measures the temperature of the isothermal block (48) to compensate the output reading for error created by the reference junction. The connectors (68) are in resilient contact with the interior wall of the isothermal block (48) to maintain good heat conductivity between the connectors and the temperature sensor (50). Portions of the connectors (68) extending outside the isothermal block (48) retain the isothermal block (48) to the circuit board (52).

12 Claims, 9 Drawing Figures

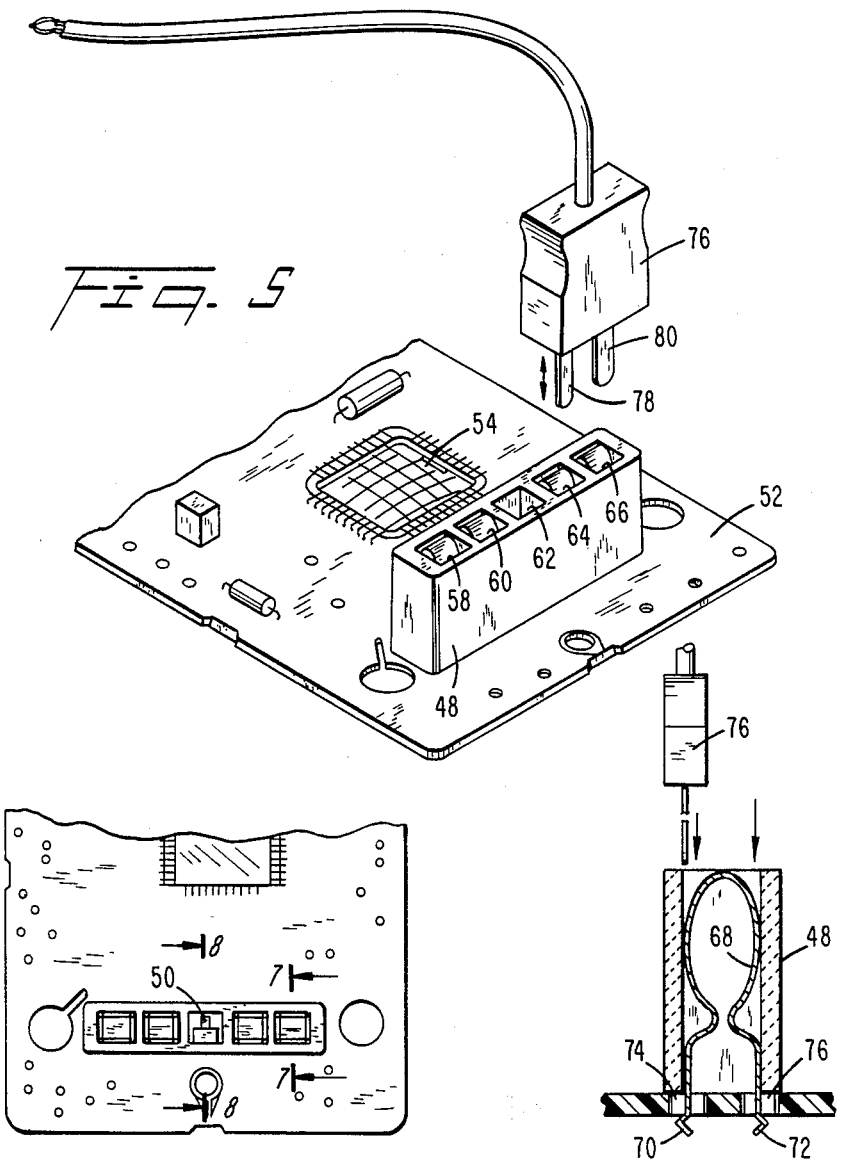

ISOTHERMAL BLOCK FOR TEMPERATURE MEASUREMENT SYSTEM USING A THERMOCOUPLE

TECHNICAL FIELD

This invention relates generally to thermocouple temperature measurement circuitry, and more particularly, toward an isothermal block for a thermocouple reference junction.

BACKGROUND ART

When two wires composed of dissimilar metals are joined at both ends, and one of the ends is heated, a continuous current flows in the wires to establish a thermoelectric circuit. If the circuit is open, the open circuit voltage, or "thermocouple voltage", is a function of the junction temperatures and the composition of the two metals. This principal is the basis of thermocouple type temperature measurement systems, wherein a junction is exposed to a temperature to be measured, and the voltage of the junctions is measured by a voltmeter to obtain a reading that is related, depending upon the type of thermocouple involved, to the measured temperature.

Thus, with reference to FIG. 1, thermocouple 10 is formed of a pair of dissimilar metal wires 12, 14 joined together at a junction 16, and with the open ends 18, 20 connected to a pair of circuit wires 22, 24 (of the same conductive material) to be measured by voltmeter 26.

The voltage measured at circuit wires 22, 24 appears, by inspection, to be equal to the voltage generated by the dissimilar metal junction 16. Upon closer analysis, however, this is not the case. Assume, for example, that thermocouple 10 is a copper-constantan (type T) thermocouple having wire 12 formed of copper (Cu) and wire 14 formed of constantan (C). Assume further that circuit wires 22, 24 as well as the wires of voltmeter 26 are formed of copper. Bearing in mind that a thermocouple is formed by junctions of dissimilar metal wires, junction 20 is a copper-constantan junction whereat an additional thermocouple voltage is developed. Junction 18 formed by copper wires 22, 24, however, does not establish a thermocouple voltage. The voltage measured by voltmeter 26 at wires 22, 24 is therefore not the voltage generated by junction 16, but rather is the sum of the voltage generated by junction 16 and the voltage generated by junction 20. Stated another way, the voltage generated by junction 20 must be subtracted from the voltage measured by voltmeter 26 to obtain the voltage generated by junction 16 and thereby determine the measured temperature. The junction 20 is referred to hereinafter as a "reference junction".

To determine the voltage of reference junction 20, the temperature of the junction must be known. As one technique used to enable the temperature of any reference junction to be determined, the junction is immersed into an ice bath, forcing the reference junction to have a fixed temperature of 0° C. The reference junction voltage at this temperature is obtained from standard tables. The voltage is subtracted from the output voltage measured by the voltmeter during each reading to obtain a voltage related directly to the temperature of junction 16.

As mentioned, because the additional junction 18 is a copper-copper junction, there is no voltage generated thereat to be taken into account in the output voltage measured by voltmeter 26. In a more general case, however, dissimilar metal junctions may be established both at junctions 18 and 20. In FIG. 2, for example, thermocouple 28 is an iron-constantan (type J) thermocouple with an iron (Fe) wire 32 and a constantan (C) wire 34 joined together at junction 30. Circuit wires 22, 24 again are made of copper. There is thus an iron-copper junction at 19 and a constantan-copper junction at 21. Assume further, however, that, as is more typical, the iron-constantan thermocouple 28 is connected to a pair of iron wires 40, 42, in turn connected to the copper circuit wires 22, 24 as shown in FIG. 3. There is, of course, no dissimilar metal junction formed at the junction 45 of iron wires 32 and 40. A dissimilar metal junction is, however, formed at the junction 44 between constantan wire 34 and iron wire 42, and iron-copper junctions also are formed at junctions 19 and 46.

Because junctions 19 and 46 are in series opposition to each other, and both are formed by the same pair of dissimilar metals, the voltages generated by the junctions will cancel if the temperatures of them are the same. The output voltage measured by voltmeter 26 at circuit wires 22 and 24 thus is substantially equal to the difference between the voltages generated by junctions 30 and 44; the voltage of junction 30 and thereby the measured temperature is, again, proportional to the difference between the voltage measured by voltmeter 26 and the voltage of the reference junction 44. Accordingly, if the temperature at junction 44 is known, the temperature at 28, independent of junctions 19 and 46, can be determined by the voltmeter 26.

To insure that junctions 19 and 46 are maintained at the same temperature, whereby the voltages at junctions 19 and 46 cancel, the two junctions are housed within an isothermal block 48, as shown in FIG. 4 (because no dissimilar metal junction is formed between iron wires 32 and 40, junction 45 is omitted from FIG. 4). To eliminate the need for a reference junction ice bath, the junction 44 is also located within the isothermal block 48 whereat the temperature of the reference junction will be measured. A temperature sensor 50 located within the isothermal block 48 measures the temperature of the isothermal block 48 as well as of reference junction 44 through stored table look up or other conventional means, the reference voltage to be subtracted from the voltage at voltmeter 26 to obtain the voltage at and thereby the temperature of junction 30 is determined.

The isothermal block 48 must be electrically insulating and have a very high thermal capacity or mass to cause all three junctions 19, 44 and 46 to be at the same temperature. This makes up for any poor thermal connection from the isothermal block 48 to temperature sensor and sensor wires by maintaining the thermocouple to be at an equitemperature. The block 48 thereby enables the temperatures of the junctions to track each other and reach thermal equilibrium in as short a time as possible. The isothermal block 48 must further retain the reference junction and sensor to a circuit board carrying additional signal processing circuitry, and the block and circuitry must be packaged compactly.

One object of the invention, therefore, is to provide an isothermal block that has a high thermal conductivity.

Another object is to provide an isothermal block that retains at least one reference junction and a junction temperature sensor to the surface of a printed circuit board.

Another object is to provide an isothermal block and reference junction temperature sensor structure that is compact, easily manufactured and mounted conveniently to a circuit board.

DISCLOSURE OF INVENTION

An isothermal block formed of a heat conducting ceramic contains a pair of through-openings containing electrical connectors for interconnecting the ends of a thermocouple and a pair of measurement circuit wires. In a third through-opening, a temperature sensor measures the temperature of the isothermal block. The three through-openings are adjacent and in close thermal communication with each other whereby the temperature measured by the temperature sensor is substantially equal to the temperature of the thermocouple reference junction. The electrical connectors as well as the temperature sensor are retained against the walls of the three openings to insure good thermal conductivity between the connectors and sensor.

In accordance with another aspect of the invention, the openings have a quadrilateral cross-section and are linearly juxtaposed within the block. The connectors are made of a resilient metal, formed approximately into a U-shape with the legs of the "U" extending outward from the block to be soldered to a printed circuit board.

Still other objects and advantages of the present invention will become readily apparent to those skilled in this art from the following detailed description, wherein we have shown and described only the preferred embodiment of the invention, simply by way of illustration of the best mode contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 5 is a view of a circuit board carrying an isothermal block, in accordance with the invention, to receive at least one thermocouple connector and a temperature sensor;

FIG. 6 is a plan view of a portion of the circuit board, exposing the interior of the isothermal block;

FIG. 7 is a cross-sectional view of the isothermal block taken along the line 7—7 in FIG. 6;

FIG. 8 is a cross-sectional view of the block taken along the line 8—8 in FIG. 6; and FIG. 9 is a perspective view of a temperature sensor retaining clip used within the block.

BEST MODE FOR PRACTICING THE INVENTION

Figure 1:
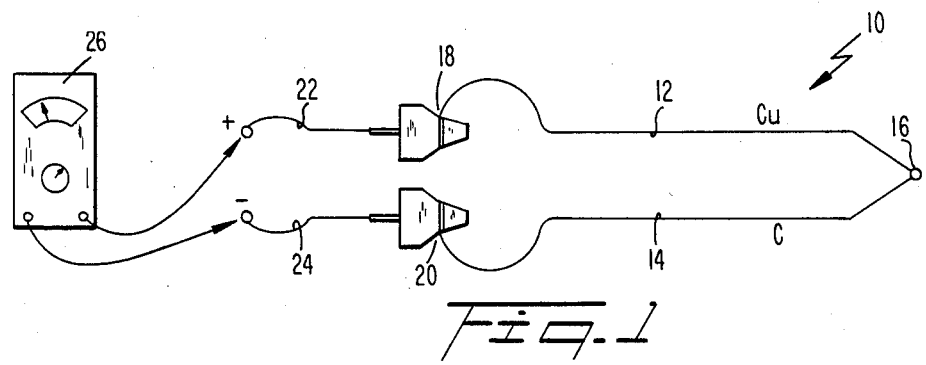
FIGS. 1-4 are diagrams of a basic thermocouple based temperature measurement system, setting forth background to help explain the invention.
Figure 2:
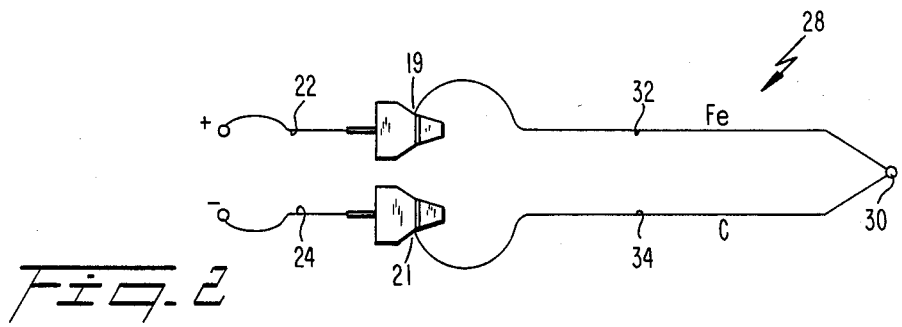
Figure 3:
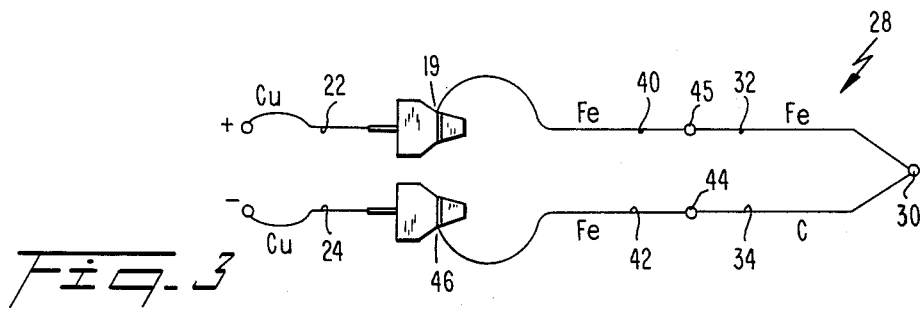
Figure 4:
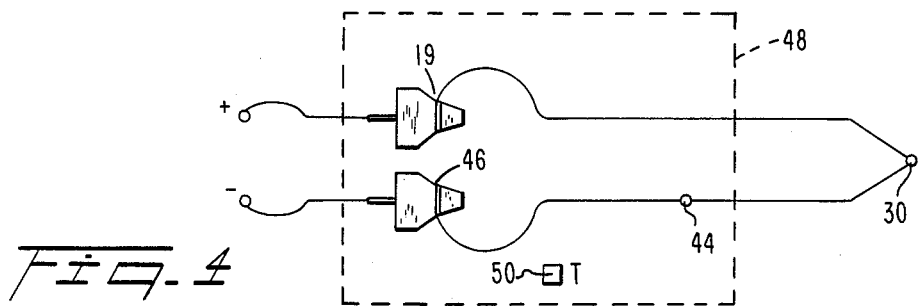

In FIG. 5, a printed circuit board 52 has printed circuit wiring (not shown) at least on one surface thereof, and supports a number of circuit components, such as integrated circuit 54. Also mounted to one side of the printed circuit board 52 is an isothermal block 48, made of a heat conducting ceramic, such as alumina ceramic, extruded or dry pressed into a rectangular parallelepiped having a series of through-openings 58–66 formed therein. Through-openings 58–60 as well as through-openings 64, 66 contain connectors, such as 68 shown in FIG. 7, generally U-shaped, with the legs 70, 72 of the "U" extending outward from the bottom of the block 56 and soldered to circuit board 52 through a pair of circuit board apertures 74, 75. Each connector 68 is made of a resilient metal which, in the preferred embodiment, is a beryllium copper alloy with an electroless nickel plating. The printed circuit board wires (not shown) in contact with connector ends 70, 72 are formed of copper.

The connector 68, as best shown in FIG. 7, is bowed outward into resilient contact with the inner wall of each quadrilateral-opening 58, 60, 64 and 66, so as to retain the terminals of a standard thermocouple miniature plug 76, inserted into the block 48 at the position of either arrow in FIG. 7. The connector 68 retains the metal contact surfaces 78, 80 of plug 76 against the inner wall of block 48 and also tends to impart a wiping action to the metal contact surfaces 78, 80 for self-cleaning as the contact surfaces are inserted or removed. In selecting the shape and size of connectors 68 as well as clearance between the connectors and inner walls of the block, balance must be made between providing good electrical, thermal and mechanical contact of the plug 78, 80, connectors 68 and block 48, and minimizing insertion force required to plug the unit 76 into the block. Preferably, the clearance established between the connectors 68 and isothermal block is 6 mils and the thickness of each connector is 32 mils. The openings 58–66 have a common quadilateral cross-section and are preferably linearly juxtaposed, as shown in FIGS. 5 and 6. The block 48 as shown accommodates two thermocouple plugs such as plug 76; the isothermal block can, however, be reduced in size to accommodate only a single plug, or extended to accommodate more than two thermocouple plugs for multiple zone temperature measurement. The distance between the centers of adjacent openings on the block 48 preferably is 313 mils.

One of the openings, preferably a central opening where the isothermal block 48 accommodates two thermocouple plugs 76 as shown in FIG. 5, retains a temperature sensor 50 to monitor the temperature of the isothermal block 48 and thereby enable thermocouple reference junction compensation to be carried out in a conventional manner. The temperature sensor 50 may, for example, be a bipolar transistor, such as an MTS type bipolar transistor having a precisely controlled base emitter junction housed in a semi-flat epoxy package, as shown in FIG. 8, with its lead extending through and soldered to the circuit board. To ensure good thermal contact between the transistor 50 and isothermal block 48 a resilient clip 84 may be provided in contact with one side of the transistor and wrapped around the wall of the isothermal block 48, as shown, to retain the transistor against the inner wall of the block.

Of particular importance, because the connectors 68 and the temperature sensor 50 are all located within the isothermal block 48, and since the thermal capacity of the block is relatively high, the rate of change of the reference junction temperature is reduced to enable the reference junction temperature sensor to track accurately ambient temperature changes. There accordingly is substantially no temperature lag between the connectors and sensor that would otherwise impart transient errors into the thermocouple readings. Furthermore, isothermal block 48, being retained to circuit board 52 by the connectors 68, requires no additional mounting hardware and accommodated compact, printed circuit board, packaging.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. For use in compact, temperature measurement instrumentation, a temperature measurement system comprising first and second wires of dissimilar metals joined together at one end to form a temperature measurement junction, opposite ends of said first and second wires are connected respectively to third and fourth wires for applying voltage developed by said measurement junction to a voltage measurement means in circuit with said third and fourth wires for making a measurement of output voltage developed by said temperature measurement junction, connections between said first wire and said third wire and between said second wire and said fourth wire forming at least one additional reference junction tending to introduce an error into said output voltage measurement, means for monitoring the temperature of said at least one additional reference junction and in response developing a reference voltage to be combined with said error containing output voltage measurement thereby providing a temperature measurement indicative of the temperature of said temperature measurement junction, and an isothermal block, comprising: an integral block of thermally conductive, electrically insulative alumina ceramic material;

said block having first, second and third similarly sized openings extending therethrough adjacent and in close thermal communication with each other; and electrical connectors in said first and second openings for connecting together said first and third wires and said second and fourth wires, respectively, wherein ends of said connectors are formed for mounting said connectors and retaining said block to a printed circuit board, said additional reference junction temperature monitoring means located in said third opening, whereby said isothermal block causes the temperatures of said at least one additional reference junction and said junction temperature monitoring means in said alumina ceramic block to remain substantially the same and closely track each other in response to changes in ambient temperature.

2. The temperature measurement system of claim 1, wherein said first, second and third openings extend completely through said block.

3. The temperature measurement system of claim 1, wherein said first, second and third openings are parallel and juxtaposed linearly.

4. The temperature measurement system of claim 1, wherein said additional temperature measurement means comprises a transistor.

5. The temperature measurement system of claim 4, including resilient clip means in said third opening to maintain said transistor in contact with the wall of said third opening.

6. The temperature measurement system of claim 1, wherein said first, second and third openings have a quadrilateral cross-section.

7. The temperature measurement system of claim 1, wherein each of said connectors is formed of a resilient metal and is generally U-shaped with opposite legs slightly spaced apart from walls of said first and second openings
for releasably retaining said first and second wires in said first and second openings and in connection with said third and fourth wires, respectively.

8. An isothermal block for maintaining at an equitemperature a junction temperature sensor and junctions interconnecting a thermocouple formed of pair of dissimilar metal wires and circuit wires coupled to a voltage measurement means for measuring a thermocouple voltage, comprising:

an integral alumina ceramic block having first and second similarly sized openings formed therethrough;

electrical connectors in said openings adapted for interconnecting said thermocouple and said circuit wires wherein ends of said connectors are formed for mounting said connectors and retaining said block to a printed circuit board; and said block having a third opening formed therethrough, said third opening having a size similar to that of the first and second openings, a temperature sensor located in said third opening in contact with said block for monitoring the temperature of the block and thereby the temperature of the junctions wherein one of said junctions comprises a thermocouple reference junction;

whereby the isothermal block causes the temperature of said reference junction and said temperature sensor in said alumina ceramic block to remain substantially the same and closely thermally track each other in response to changes in ambient temperature.

9. The isothermal block of claim 8, wherein said electrical connectors are formed of a resilient metal slightly spaced apart from the walls of said first and second openings
for releasably connecting said thermocouple and said circuit wires.

10. The isothermal block of claim 9 wherein said connectors are generally U-shaped and said first and second openings have a quadrilateral cross-section.

11. The isothermal block of claim 8 including a resilient clip means in said third opening for retaining said temperature sensor in contact with the wall of said third opening.

12. The isothermal block of claim 8, wherein said first, second and third openings are parallel and juxtaposed linearly in said block.

* * * * *